United States Patent
Hwang et al.

(10) Patent No.: US 8,993,175 B2
(45) Date of Patent: Mar. 31, 2015

(54) POLYMER ELECTROLYTE, LITHIUM BATTERY COMPRISING THE POLYMER ELECTROLYTE, METHOD OF PREPARING THE POLYMER ELECTROLYTE, AND METHOD OF PREPARING THE LITHIUM BATTERY

(75) Inventors: Seung-sik Hwang, Seongnam-si (KR); Han-su Kim, Seoul (KR); Jae-man Choi, Hwaseong-si (KR); Moon-seok Kwon, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 783 days.

(21) Appl. No.: 12/615,376

(22) Filed: Nov. 10, 2009

(65) Prior Publication Data
US 2010/0119950 A1 May 13, 2010

(30) Foreign Application Priority Data

| Nov. 10, 2008 | (KR) | 10-2008-0111221 |
| Dec. 2, 2008 | (KR) | 10-2008-0121285 |
| Oct. 27, 2009 | (KR) | 10-2009-0102289 |

(51) Int. Cl.
| *H01M 6/18* | (2006.01) |
| *H01M 10/0565* | (2010.01) |
| *H01M 10/0567* | (2010.01) |
| *H01M 10/04* | (2006.01) |
| *H01M 10/0525* | (2010.01) |

(52) U.S. Cl.
CPC .......... *H01M 10/0565* (2013.01); *Y02E 60/122* (2013.01); *H01M 10/04* (2013.01); *H01M 10/0525* (2013.01); *H01M 10/0567* (2013.01); *H01M 2300/0025* (2013.01)
USPC .......... 429/307; 429/199; 429/200; 429/303; 429/300; 429/306; 429/323; 429/324; 252/62.2; 29/623.1

(58) Field of Classification Search
CPC .............. H01M 10/0567; H01M 10/0565; H01M 10/0525; H01M 2300/0025; H01M 10/04; Y02E 60/122

USPC .......... 429/303, 300, 306, 307, 199, 324, 200, 429/323; 252/62.2; 29/623.1
See application file for complete search history.

(56) References Cited

U.S. PATENT DOCUMENTS

| 5,741,610 | A | 4/1998 | Andrei et al. | |
| 5,756,231 | A | * 5/1998 | Andrei et al. | 429/303 |
| 5,798,190 | A | * 8/1998 | Andrei et al. | 429/122 |
| 6,482,545 | B1 | 11/2002 | Skotheim et al. | |
| 6,511,769 | B1 | 1/2003 | Jung et al. | |
| 2004/0126665 | A1 | 7/2004 | Sun | |
| 2010/0119956 | A1 | 5/2010 | Tokuda et al. | |

FOREIGN PATENT DOCUMENTS

| DE | 198 30 993 | | 1/2000 |
| DE | 19830993 | * | 1/2000 |
| EP | 0 638 950 | | 2/1995 |
| JP | 1135856 | A | 5/1989 |
| JP | 1997223497 | A | 8/1997 |
| JP | 1997223498 | A | 8/1997 |
| JP | 2000082328 | A | 3/2000 |
| JP | 2002050398 | A | 2/2002 |
| JP | 2007134343 | A | 5/2007 |
| JP | 2008084838 | A | 4/2008 |
| KR | 1020000075395 | A | 12/2000 |
| KR | 100330148 | B1 | 3/2002 |
| KR | 1020070008084 | A | 1/2007 |
| KR | 1020100052407 | A | 5/2010 |
| WO | WO 2008/126800 | | 10/2008 |

OTHER PUBLICATIONS

European Search Report issued Feb. 24, 2010 in corresponding European Patent Application No. 09175283.2.
European Search Report issued May 9, 2011, in corresponding European Application No. 09 175 283.2.
Japan Office Action for Patent Application No. 2009-257085 dated Nov. 26, 2013 with English Translation, 9 pages.

* cited by examiner

*Primary Examiner* — Laura Weiner
(74) *Attorney, Agent, or Firm* — Cantor Colburn LLP

(57) ABSTRACT

A polymer electrolyte including: a lithium salt; an organic solvent; a fluorine compound; and a polymer of a monomer represented by Formula 1 below.

$$H_2C=C-(OR)_n-OCH=CH_2 \qquad \text{Formula 1}$$

In Formula 1, R is a C2-C10 alkylene group, and n is in a range of about 1 to about 1000.

35 Claims, 1 Drawing Sheet

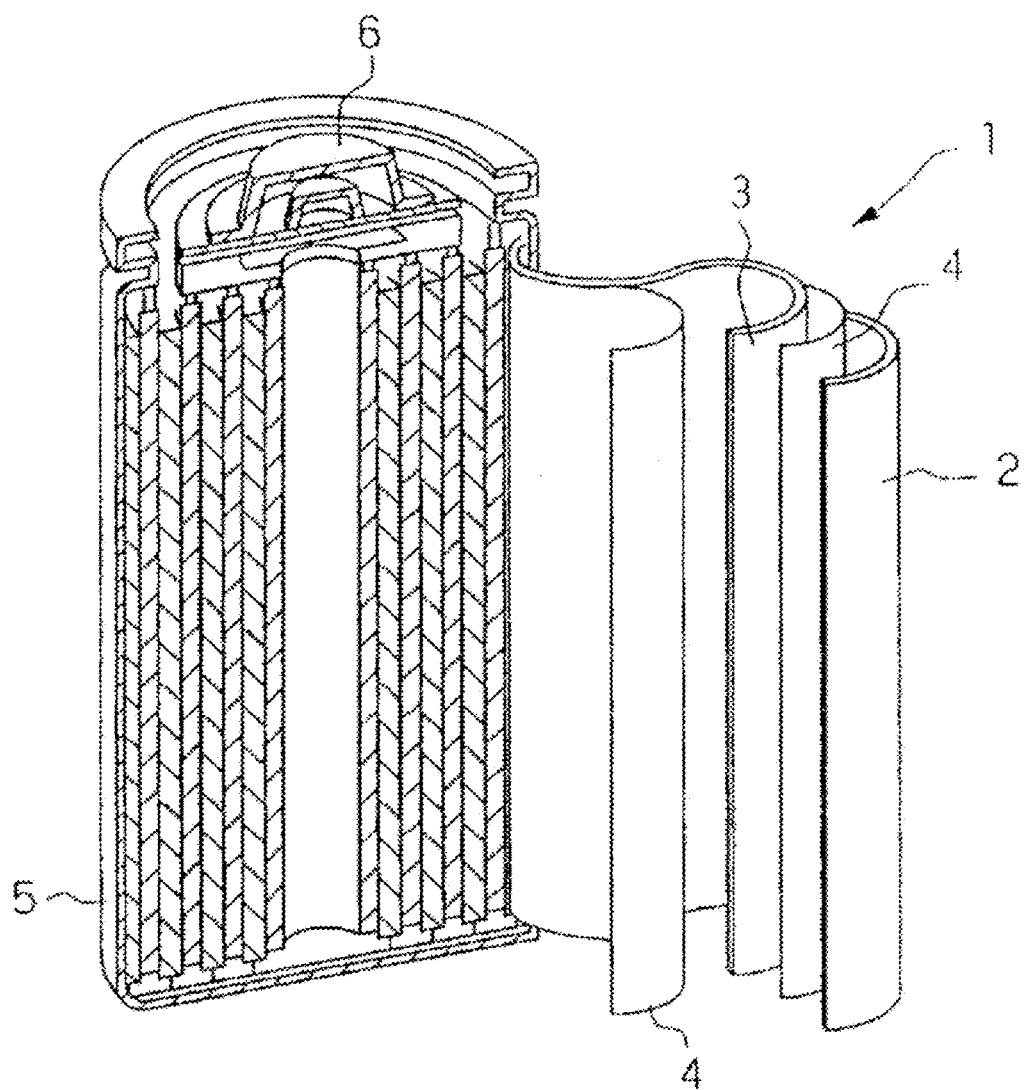

POLYMER ELECTROLYTE, LITHIUM BATTERY COMPRISING THE POLYMER ELECTROLYTE, METHOD OF PREPARING THE POLYMER ELECTROLYTE, AND METHOD OF PREPARING THE LITHIUM BATTERY

CROSS-REFERENCE TO RELATED APPLICATIONS

This application claims the benefit of Korean Patent Application No. 10-2008-0111221, filed on Nov. 10, 2008, Korean Patent Application No. 10-2008-0121285, filed on Dec. 2, 2008, and Korean Patent Application No. 10-2009-0102289, filed on Oct. 27, 2009, in the Korean Intellectual Property Office, the disclosures of which are incorporated herein in, by reference.

BACKGROUND

1. Field

One or more exemplary embodiments relate to a polymer electrolyte, a lithium battery including the polymer electrolyte, a method of preparing the polymer electrolyte, and a method of preparing the lithium battery.

2. Description of the Related Art

Flexible electronic devices such as electronic paper have received a large amount of public attention. Such flexible electronic devices are powered by a secondary battery. Secondary batteries used in flexible electronic devices should be flexible and an electrolyte used in the secondary batteries should not leak. Thus, the electrolyte may be a polymer electrolyte.

Flexible electronic devices may be manufactured using a thin film deposition process or a printing process. Since thin film deposition is complicated and has higher manufacturing costs, printing is widely used. Thus, a secondary battery may be manufactured using a printing process, and a polymer electrolyte contained in the secondary battery may also be manufactured using a printing process.

Polymer electrolytes are cured using a light curing method or thermal curing method, by radiating UV light, electro beams, or heat onto an electrolyte including a monomer and an initiator. However, a curing device used to perform light curing or thermal curing may not be applicable to a printing process. Therefore, there is still a need to develop a method of preparing a polymer electrolyte applicable to a printing process, without the need for a separate curing device.

SUMMARY

One or more exemplary embodiments include a polymer electrolyte.

One or more exemplary embodiments include a lithium battery including the polymer electrolyte.

One or more exemplary embodiments include a method of preparing the polymer electrolyte.

One or more exemplary embodiments include a method of preparing the lithium battery.

To achieve the above and/or other aspects, one or more exemplary embodiments may include a gel polymer electrolyte including: a first lithium salt; an organic solvent; a fluorine compound; and a polymer of a monomer represented by Formula 1 below:

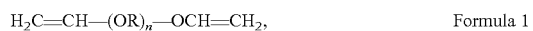

wherein R is a C2-C10 alkylene group, and n is from about 1 to about 1000.

To achieve the above and/or other aspects, one or more exemplary embodiments may include a lithium battery including: a cathode; an anode; and the gel polymer electrolyte.

To achieve the above and/or other aspects, one or more exemplary embodiments may include a method of preparing a gel polymer electrolyte, the method including: preparing a first solution including a fluorine compound and an organic solvent; preparing a second solution including a monomer represented by Formula 1 below and an organic solvent; and mixing the first solution with the second solution, wherein the first solution or the second solution further includes a first lithium salt:

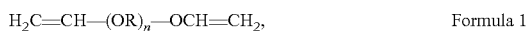

wherein R is a C2-C10 alkylene group, and n is from about 1 to about 1000.

To achieve the above and/or other aspects, one or more exemplary embodiments may include a method of preparing a lithium battery, the method including: preparing a first solution including a fluorine compound and an organic solvent; preparing a second solution including a monomer represented by Formula 1 below and an organic solvent; and respectively coating or printing the first solution and the second solution on electrodes, to form a gel polymer electrolyte, wherein the gel polymer electrolyte further includes a first lithium salt:

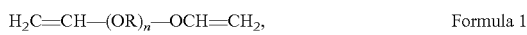

wherein R is a C2-C10 alkylene group, and n is from about 1 to about 1000.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present teachings will become apparent and more readily appreciated from the following description of the exemplary embodiments, taken in conjunction with the accompanying drawings, of which:

FIG. 1 is a schematic view of a lithium battery according to an exemplary embodiment.

DETAILED DESCRIPTION

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

Hereinafter, a gel polymer electrolyte, a lithium battery including the gel polymer electrolyte, a method of preparing the gel polymer electrolyte, and a method of preparing the lithium battery will be described. A gel polymer electrolyte, according to an exemplary embodiment, includes: a first lithium salt, an organic solvent, a fluorine compound, and a polymer of a monomer represented by Formula 1 below.

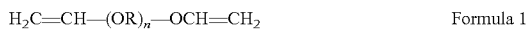

In Formula 1, R is a C2-C10 alkylene group, and n is in a range of from about 1 to about 1000.

The fluorine compound reacts with residual moisture in the organic solvent, to produce a Protonic acid or a Lewis acid.

However, the first lithium salt generally does not produce a Protonic acid or a Lewis acid, by reacting with the residual moisture in the organic solvent. That is, the first lithium salt is inactive with respect to the residual moisture.

The polymer of the monomer represented by Formula 1 may be prepared according to the following process. First, the fluorine compound reacts with a very small amount of residual moisture in the organic solvent, to produce a Protonic acid or a Lewis acid. The produced Protonic acid or Lewis acid operates as a polymerization initiator, by activating a carbocation of the monomer of Formula 1, to initiate a cationic polymerization. Accordingly, a crosslinked polyvinyl ether-based polymer is produced by the cationic polymerization. Due to two functional groups of the monomer of Formula 1, a variety of crosslinking reactions occur, to form a matrix of the polyvinyl ether-based polymer.

The polyvinyl ether-based polymer may be included in an electrolyte solution including the first lithium salt, the organic solvent, and the fluorine compound, before being completely cured in the polymerization process. As a result, the polymer is impregnated with the electrolyte solution, to obtain a gel polymer electrolyte.

The gel polymer electrolyte may inhibit irreversible reactions between an anode active material and the electrolyte solution, and may operate as a support for the structures of the active material and the electrodes, during charging and discharging. Thus, the lithium battery including the gel polymer electrolyte may have excellent charging and discharging characteristics.

However, if the polymer is rapidly cured, before the polymer is impregnated with the organic solvent, the organic solvent may not be properly impregnated into the polymer. As a result, the cured polymer may be separated from the organic solvent. For example, if the separated polymer is attached to the surface of the electrode, the organic solvent may not contact the surface of the electrode, and thus, the electrode may not perform properly.

Since the gel polymer electrolyte is prepared by the reaction between the Protonic acid and Lewis acid generated from the fluorine compound and the monomer, a curing device or an initiator is not required. In addition, the polymerization rate may be regulated by controlling the amount and/or type of the fluorine compound.

The polymerization of the monomer of Formula 1 may be conducted at room temperature. However, the polymerization may be conducted at temperatures ranging from a temperature at which the first lithium salt is precipitated, to the boiling point of the organic solvent. For example, the temperature of polymerization may range from 10 to 40° C.

The fluorine compound may be a fluorinated organic compound, a second lithium salt including fluorine, or a mixture thereof. The fluorinated organic compound may be one of the compounds represented by Formulae 2 to 8 below, but is not limited thereto. The fluorinated organic compound may be any compound that produces a Protonic acid or a Lewis acid, by reacting with residual moisture in an electrolyte solution.

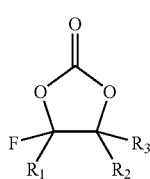

Formula 2

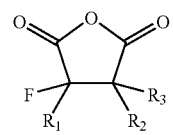

Formula 3

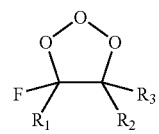

Formula 4

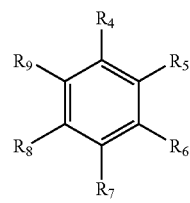

Formula 5

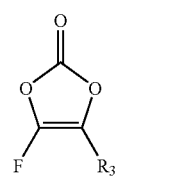

Formula 6

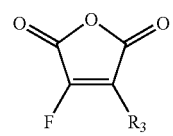

Formula 7

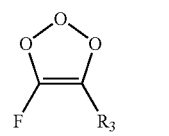

Formula 8

In Formulae 2 to 8, $R_1$ to $R_3$ may be each independently a hydrogen atom or a C1 to C10 alkyl group that is unsubstituted or substituted with a fluorine atom. $R_4$ to $R_9$ may be each independently a fluorine atom or a C1 to C10 alkyl group that unsubstituted or substituted with a fluorine atom, wherein at least one of $R_4$ to $R_9$ is a fluorine atom.

The second lithium salt including fluorine may be $LiBF_4$, $LiPF_6$, $LiAsF_6$, $LiSbF_6$, $LiPF_3(CF_2CF_3)_3$, or any mixtures thereof, but is not limited thereto. In this regard, the second lithium salt may be any lithium salt that produces a Protonic acid or a Lewis acid, by reacting with residual moisture in an electrolyte solution.

For example, if the electrolyte solution has a high concentration of the second lithium salt, the amount of a Protonic acid or a Lewis acid that is produced by the reaction between the second lithium salt and the residual moisture in the organic solvent may rapidly increase. Thus, the rate of the polymerization initiated by the Protonic acid or Lewis acid may rapidly increase. As a result, since the polymerization begins as soon as the second lithium salt is mixed with the monomer, a completely cured polymer including a repeating unit of the monomer may be separated from the electrolyte solution (insufficiently impregnated).

The first lithium salt may be $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$, wherein p and q are integers, lithium difluoro (oxalato) borate (LiFOB), lithium bis(oxalato)borate (LiBOB), lithium (malonato oxalato) borate (LiMOB), or any mixtures thereof, but is not limited thereto. In this regard, the first lithium salt may be any lithium salt that does not produce a Protonic acid or a Lewis acid by reacting with residual moisture in an electrolyte solution.

For example, the first lithium salt may or may not include fluorine. Even if the first lithium salt includes fluorine, the first lithium salt does not produce a Protonic acid or a Lewis acid. For example, the first lithium salt may be a lithium salt, in which a fluorine atom is bonded to a carbon atom and does not react with moisture. On the other hand, the second lithium salt is a lithium salt that produces a Protonic acid or a Lewis acid, by reacting with the moisture.

In the gel polymer electrolyte, the amount of the fluorine compound may be in a range of from about 0.1 to 30 wt %, based on the total weight of the gel polymer electrolyte. For example, the fluorine compound may be in a range of from about 0.5 to 20 wt %, based on the total weight of the gel polymer electrolyte.

In the gel polymer electrolyte, the amount of the polymer may be in the range of from about 0.1 to 30 wt %, based on the total weight of the gel polymer electrolyte. For example, the amount of the polymer may be in the range of from about 0.5 to 20 wt %, based on the total weight of the gel polymer electrolyte. However, the amount of the polymer is not limited thereto, and may be any suitable amount, so long as the charging and discharging characteristics of a lithium battery including the gel polymer electrolyte are suitable.

The concentration of the first lithium salt may be in a range of from about 0.01 to about 2.0 M. This concentration of the first lithium salt may be suitable for the preparation of the gel polymer electrolyte. However, the concentration of the first lithium salt may also be in a range of from about 0.5 to about 2 M in some aspects.

The organic solvent may be a high dielectric constant solvent, a low boiling point solvent, or a mixture thereof. The high dielectric constant solvent may have a dielectric constant ranging from about 30 to about 100, and the low boiling point solvent may have a boiling point ranging from about 77 to about 150° C. However, the organic solvent is not limited thereto, and any suitable organic solvent may be used.

The high dielectric constant solvent may be a cyclic carbonate, such as fluorinated ethylene carbonate, ethylene carbonate, propylene carbonate, and butylene carbonate; γ-butyrolactone; and/or any mixtures thereof, but is not limited thereto. The low boiling point solvent may be: a chain carbonate, such as dimethyl carbonate, ethylmethyl carbonate, diethyl carbonate, and dipropyl carbonate; dimethoxyethane; diethoxyethane; a fatty acid ester derivative; and/or any mixtures thereof, but is not limited thereto.

In the mixture of the high dielectric constant solvent and the low boiling point solvent, the volumetric ratio of the high dielectric constant solvent to the low boiling point solvent may be from about 1:1 to about 1:9. When the volumetric ratio is within this range, a battery including the organic solvent may have an excellent discharge capacity and charge/discharge cycle life.

A lithium battery according to an exemplary embodiment may include a cathode, an anode, and the gel polymer electrolyte. The lithium battery may be prepared according to the process described below.

A cathode active material, a conductive material, a binder, and a solvent are mixed, to prepare a cathode active material composition. The cathode active material composition is directly coated on an aluminum current collector and then dried, to prepare a cathode plate. Alternatively, the cathode active material composition is cast on a separate support, and then a film delaminated from the support is laminated on an aluminum current collector, to prepare a cathode plate. Alternatively, the cathode active material composition is prepared in the form of an electrode ink including an excess amount of solvent. The ink is then printed using an inkjet printing method or a gravure printing method, to prepare a cathode plate. The printing method is not limited thereto, and any suitable method that is commonly used in a coating or printing operation.

The cathode active material may be any lithium-containing metal oxide that is commonly used in the art. For example, the cathode active material may be $LiCoO_2$, $LiMn_xO_{2x}$ (x=1, 2), $LiNi_{1-x}Mn_xO_{2x}$ (0<x<1), $Ni_{1-x-y}Co_xMn_yO_2$ (0≤x≤0.5, 0≤y≤0.5), $LiFePO_4$, or the like.

The conducting material may be carbon black, for example. The binder may be a vinylidenefluoride/hexafluoropropylene copolymer, polyvinylidenefluoride, polyacrylonitrile, polymethylmethacrylate, polytetrafluoroethylene, or any mixtures thereof, polyimide, polyamideimide, a styrene butadiene rubber polymer, an acrylate rubber, or sodium carboxymethylcellulose. The solvent may be N-methylpyrrolidone, acetone, water, or the like. The amounts of the cathode active material, the conductive material, the binder, and the solvent are as commonly used in a lithium battery.

Similarly, an anode active material, a conductive material, a binder, and a solvent are mixed, to prepare an anode active material composition. The anode active material composition is directly coated on a copper current collector, to prepare an anode plate. Alternatively, the anode material composition is cast on a separate support, and then an anode active material film delaminated from the support is laminated on the copper current collector, to prepare an anode plate. Alternatively, the anode active material composition is prepared in the form of an electrode ink, including an excess amount of solvent. The ink is then printed using an inkjet printing method or a gravure printing method, to prepare an anode plate. The printing method is not limited thereto, and may be any suitable method that is commonly used in a coating or printing operation.

The amounts of the anode active material, the conducting material, the binder, and the solvent are as commonly used in a lithium battery. Anode active materials may: be a graphite material such as graphite granules; a metal alloyable with lithium, such as silicon fine granules; a graphite/silicon composite; a transition metal oxide such as $Li_4Ti_5O_{12}$; or the like, but is not limited thereto. Any suitable anode active material that is commonly used in the art may also be used. For example, the graphite granules may be natural graphite, artificial graphite, or the like. The diameter of the graphite granules may be in a range of from about 5 to about 30 μm. The diameter of the silicon fine granules may be in a range of from about 50 nm to about 10 μm. The graphite granules and the silicon fine granules may be mixed using any suitable method commonly used in the art, such as mechanical milling, in order to prepare a graphite/silicon composite.

The conductive material, the binder, and the solvent used in the anode active material composition may be the same as those used in the cathode active material composition. Pores may be formed in the electrode plates, by adding a plasticizer to the cathode active material composition and the anode active material composition.

Next, a separator is prepared to separate the cathode and the anode. Any suitable separator commonly used in the lithium battery field may be used. In particular, the separator may have low resistance to ion transfer in an electrolyte and excellent electrolyte impregnation properties. For example, the separator may be formed of glass fiber, polyester, polyethylene, polypropylene, a fluoro-polymer such as polytetrafluoroethylene (PTFE), or any combinations thereof. The separator may be in the form of a non-woven fabric or a woven fabric. In more detail, a windable separator formed of a material such as polyethylene or polypropylene may be used. In a lithium ion polymer battery, a separator having excellent organic electrolyte impregnation properties may be used.

The separator may be prepared according to the process described below. A polymer resin, a filler, and a solvent are mixed to prepare a separator composition. The separator composition is directly coated on an electrode and then dried, to form a separator film. Alternatively, the separator composition is cast on a support and dried, and then a separator film delaminated from the support is then laminated on an electrode.

The polymer resin is not particularly limited and may be any suitable material that may be used as a binder for an electrode plate. For example, a vinylidenefluoride/hexafluoropropylene copolymer, polyvinylidenefluoride, polyacrylonitrile, polymethylmethacrylate, or any mixtures thereof may be used. A vinylidenefluoride/hexafluoropropylene copolymer, having from about 8 to 25% by weight of hexafluoropropylene, may be used.

Next, an electrolyte is prepared. The gel polymer electrolyte according to an exemplary embodiment may be used in the lithium battery. For example, the gel polymer electrolyte may include a first lithium salt, an organic solvent, a fluorine compound, and a polymer of a monomer represented by Formula 1 below.

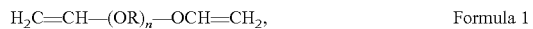

$$H_2C=CH-(OR)_n-OCH=CH_2, \quad \text{Formula 1}$$

wherein R is a C2-C10 alkylene group, and n is from about 1 to about 1000.

The separator is interposed between the cathode plate and the anode plate, to form a battery structure (electrode assembly). The battery structure is wound or folded and encased in a cylindrical battery case, prismatic battery case, or a laminated film case. The first electrolyte solution including the fluorine compound and the organic solvent, and the second electrolyte solution including the monomer of Formula 1 and the organic solvent, are sequentially injected into the battery case, to prepare a lithium ion polymer battery. By the polymerization performed while the first electrolyte solution and the second electrolyte solution are mixed, a gel polymer electrolyte, in which a polymer is impregnated with an organic solvent, may be prepared. In this regard, the first electrolyte solution or the second electrolyte solution may further include the first lithium salt.

Alternatively, in the lithium battery, the gel polymer electrolyte may be formed on the cathode plate and/or the anode plate, using a coating or printing operation. For example, the first electrolyte solution and the second electrolyte solution are simultaneously or sequentially coated or printed on the anode plate and/or the cathode plate, to form the gel polymer electrolyte. A separator is interposed between the cathode plate and the anode plate, for form a battery structure. The battery structure is wound or folded and encased in a cylindrical battery case, prismatic battery case, or a laminated film case, to prepare a lithium ion polymer battery.

FIG. 1 is a schematic view of a lithium battery 1 according to an embodiment. Referring to FIG. 1, the lithium battery 1 includes a cathode 3, an anode 2 and a separator 4. The cathode 3, the anode 2 and the separator 4 are wound or folded and then accommodated in a battery case 5. The battery case 5 is injected with the first and the second electrolytic solutions and then sealed with a cap assembly 6, to complete the manufacture of the lithium battery 1. The battery case 5 may have a cylindrical, rectangular, or pouch-type. The lithium battery 1 may be a lithium ion battery.

The lithium ion polymer battery may be a flexible battery. For example, the lithium ion polymer battery may be easily bent.

A method of preparing a gel polymer electrolyte, according to another exemplary embodiment, may include: preparing a first solution including a fluorine compound and a organic solvent; preparing a second solution including a monomer represented by Formula 1 and an organic solvent; and mixing the first solution with the second solution, wherein the first solution or the second solution further includes a first lithium salt.

In the method of preparing the gel polymer electrolyte, the fluorine compound may produce a Protonic acid or a Lewis acid, by reacting with the residual moisture in the organic solvent. The first lithium salt may be inactive with respect to the residual moisture. By mixing the first solution and the second solution, the fluorine compound reacts with the organic solvent, to produce a Protonic acid or a Lewis acid. The cationic polymerization of the monomer of Formula 1 is initiated by the Protonic acid or Lewis acid, to obtain the polymer.

The polymer is impregnated with the electrolyte solution, to form a gel. For example, the polymer may be impregnated with the electrolyte solution, before the polymer is completely cured. However, the organic solvent generally cannot be impregnated into the polymer, after the polymer is completely cured.

The polymerization of the monomer of Formula 1 may be conducted at room temperature. In some aspects, the polymerization may be conducted at a temperature ranging from a temperature at which the first lithium salt is precipitated, to the boiling point of the organic solvent. For example, the temperature may be in the range of 10 to 40° C.

In addition, since the polymerization is initiated by the Protonic acid or Lewis acid produced by the reaction between the fluorine compound and the residual moisture in the organic solvent, a separate polymerization initiator, such as heat or UV light, is not required. Thus, the gel polymer electrolyte may be simply and efficiently prepared.

In the method of preparing the gel polymer electrolyte, the polymerization rate may be regulated according to the amount of and type of fluorine compound that produces the Protonic acid or Lewis acid, when the first solution is mixed with the second solution. A low amount of Protonic acid or Lewis acid results in a reduced polymerization rate while a large amount results in a increased polymerization rate. A suitable fluorine compound producing Protonic acid or Lewis acid, therefore, may be selected for a desired polymerization rate. For a certain fluorine compounds, even a small amount may produce a large amount of Protonic acid or Lewis acid. Similarly, for certain fluorine compounds, even a large amount may produce a small amount of protonic acid or Lewis acid.

In the method of preparing the gel polymer electrolyte, the method of mixing the first solution and the second solution is not limited. For example, the first solution may be mixed with the second solution, by simultaneously or sequentially coating or printing the first solution and the second solution on the cathode plate and/or the anode plate.

The fluorine compound may be a fluorinated organic compound, a second lithium salt including fluorine, or a mixture thereof. The fluorinated organic compound may be one of the compounds represented by Formulae 2 to 8 below, but is not limited thereto. The fluorinated organic compound may be any compound that produces a Protonic acid or a Lewis acid, by reacting with residual moisture in an electrolyte solution:

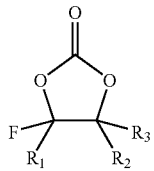

Formula 2

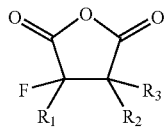

Formula 3

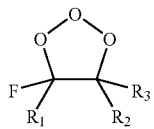

Formula 4

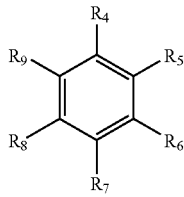

Formula 5

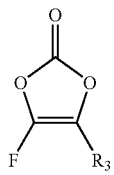

Formula 6

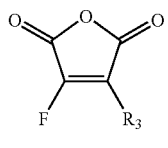

Formula 7

Formula 8

In Formulae 2 to 8, $R_1$ to $R_3$ may be each independently a hydrogen atom or a C1 to C10 alkyl group that is unsubstituted or substituted with a fluorine atom. $R_4$ to $R_9$ may be each independently a fluorine atom or a C1 to C10 alkyl group that is unsubstituted or substituted with a fluorine atom. At least one of $R_4$ to $R_9$ is a fluorine atom.

The second lithium salt including fluorine may be $LiBF_4$, $LiPF_6$, $LiAsF_6$, $LiSbF_6$, $LiPF_3(CF_2CF_3)_3$, or any mixtures thereof, but is not limited thereto. In this regard, the second lithium salt may be any lithium salt that produces a Protonic acid or a Lewis acid, by reacting with residual moisture in an electrolyte solution.

The first lithium salt does not produce a Protonic acid or Lewis acid when exposed to moisture. For example, the first lithium salt is inactive with respect to the very small amount of moisture in the organic solvent. In other words, the first lithium salt does not produce hydrogen ions that form a Protonic acid or a Lewis acid.

For example, the first lithium salt may be LiCl, LiI, $LiAlO_2$, $LiAlCl_4$, $LiClO_4$, $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$, wherein p and q are integers, lithium difluoro (oxalato) borate (LiFOB), lithium bis(oxalato)borate (LiBOB), lithium (malonato oxalato) borate (LiMOB), or any mixtures thereof, but is not limited thereto. Any lithium salt that does not produce a Protonic acid or a Lewis acid, when mixed with moisture in the electrolyte solution, may also be used.

In the method of preparing the gel polymer electrolyte, the amount of the fluorine compound may be in a range of from about 0.1 to about 30% by weight, based on the total weight of the first and second electrolyte solutions. When the amount of the fluorine compound is within the range described above, the cationic polymerization rate of the monomer of Formula 1 may be appropriately regulated. That is, the amount of the fluorine compound described above is suitable for the preparation of the gel polymer electrolyte. For example, the amount of the fluorine compound may be in a range of from about 0.5 to about 20% by weight, based on the total weight of the first and second electrolyte solutions.

In the method of preparing the gel polymer electrolyte, the amount of the monomer of Formula 1 may be in a range of from about 0.1 to about 30% by weight, based on the total weight of the first and second electrolyte solutions. That is, the amount of the fluorine compound described above is suitable for the preparation of the gel polymer electrolyte including a gel polymer electrolyte. For example, the amount of the polymer may be in a range of from about 0.5 to about 20% by weight, based on the total weight of the first and second electrolyte solutions. However, the amount of the polymer is not limited thereto, as long as the charging and discharging characteristics of the lithium battery including the gel polymer electrolyte are sufficient.

In the method of preparing the gel polymer electrolyte, the molecular weight of the monomer represented by Formula 1 may be in a range of from about 100 to about 1000. The molecular weight of the monomer within the range described above is suitable for the preparation of the gel polymer electrolyte.

A method of preparing a lithium battery according to another exemplary embodiment may include; preparing a first solution including a fluorine compound and an organic solvent, preparing a second solution including a monomer represented by Formula 1 and an organic solvent; and coating or printing the first solution and the second solution on electrodes, to form a gel polymer electrolyte, wherein the gel polymer electrolyte further includes a first lithium salt.

In the method of preparing the lithium battery, the forming the gel polymer electrolyte may be performed by simultaneously or sequentially coating or printing the first and second solutions. In the method of preparing the lithium battery, the fluorine compound may produce a Protonic acid or a Lewis acid, by reacting with the residual moisture in the organic solvent, and the first lithium salt may be inactive with respect to the residual moisture.

In the method of preparing the lithium battery, by simultaneously or sequentially coating or printing the first solution and the second solution on the electrodes, the fluorine compound contained in the first solution reacts with the residual moisture in the organic solvent, to produce a Protonic acid or a Lewis acid, and the cationic polymerization of the monomer of Formula 1 contained in the second solution is initiated by the Protonic acid or Lewis acid, to obtain the polymer.

The polymer may be impregnated with the electrolyte solution including the first lithium salt, the organic solvent, and the fluorine compound that is contained in the first solution and/or the second solution, before the polymer is completely cured in the polymerization process. In addition, since the cationic polymerization of the monomer of Formula 1 is initiated by the Protonic acid or Lewis acid, a separate polymerization initiator is not required. Thus, the gel polymer electrolyte may be simply and efficiently prepared.

In the method of preparing the lithium battery, the cationic polymerization of the monomer of Formula 1 may be conducted at the temperature ranges recited above. Since the gel polymer electrolyte is prepared at room temperature, using a coating or printing method, without using a curing device and an initiator, the lithium battery may be simply prepared.

In the method of preparing the lithium battery, the fluorine compound may be a fluorinated organic compound, a second lithium salt including fluorine, or a mixture thereof. In the method of preparing the lithium battery, the fluorinated organic compound may be one of the compounds represented by Formulae 2 to 8 below, but is not limited thereto. The fluorinated organic compound may be any compound that produces Protonic acid or Lewis acid by the reaction with residual moisture in an electrolyte solution:

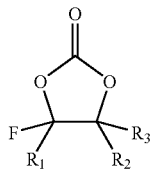
Formula 2

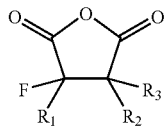
Formula 3

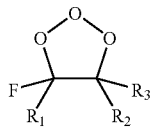
Formula 4

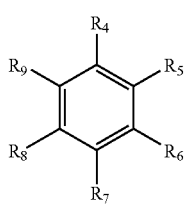
Formula 5

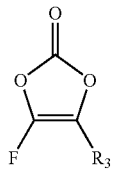
Formula 6

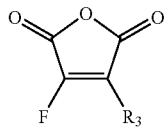
Formula 7

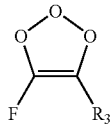
Formula 8

In Formulae 2 to 8, $R_1$ to $R_3$ may be each independently a hydrogen atom or a C1 to C10 alkyl group that is unsubstituted or substituted with a fluorine atom, and $R_4$ to $R_9$ may be each independently a fluorine atom or a C1 to C10 alkyl group that is unsubstituted or substituted with a fluorine atom, wherein at least one of $R_4$ to $R_9$ is a fluorine atom.

The second lithium salt including fluorine may be $LiBF_4$, $LiPF_6$, $LiAsF_6$, $LiSbF_6$, $LiPF_3(CF_2CF_3)_3$, or any mixtures thereof, but is not limited thereto. In this regard, the second lithium salt may be any lithium salt that produces a Protonic acid or a Lewis acid, by reacting with residual moisture in an electrolyte solution.

The first lithium salt does not produce a Protonic acid or a Lewis acid, when mixed with moisture. For example, the first lithium salt is inactive with respect to the very small amount of moisture in the organic solvent. In other words, the first lithium salt does not produce hydrogen ions that form the Protonic acid or Lewis acid.

For example, the first lithium salt may be $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$, wherein p and q are integers, lithium difluoro (oxalato) borate (LiFOB), lithium bis(oxalato)borate (LiBOB), lithium (malonato oxalato) borate (LiMOB), or any mixtures thereof, but is not limited thereto. Any lithium salt that does not produce a Protonic acid or a Lewis acid, when mixed with moisture in the electrolyte solution, may also be used.

Hereinafter, the present teachings will be described more specifically with reference to the following examples. The following examples are for illustrative purposes only and are not intended to limit the scope of the present teachings.

Preparation of Composite Anode Active Material

PREPARATION EXAMPLE 1

3 g of graphite granules (C1SR, Japan) having an average particle diameter of 25 μm and 1.5 g of silicon fine granules (Spherical Type, Nanostructured & Amorphous Materials, Inc., U.S.A.) having an average particle diameter of 100 nm were milled using a high energy ball mill (SPEX, 8000M) for 60 minutes, to prepare an anode active material in the form of a graphite/silicon composite.

Preparation of Lithium Battery Including Composite Anode Active Material

EXAMPLE 1

70 parts by weight of the anode active material prepared according to Preparation Example 1 were mixed with 15 parts by weight of a graphite based conducting material (SFG6, Timcal Inc.) and 30 parts by weight of a solution including 5% by weight of polyvinylidenefluoride (PVdF) dissolved in N-methylpyrrolidone in an agate mortar, to prepare a slurry. The slurry was coated on a copper current collector having a thickness of 15 μl, using a doctor blade, to a thickness of about 60 μm, dried in a convection oven at 100° C. for 2 hours, and further dried in a vacuum at 120° C., for 2 hours, to prepare an anode plate.

CR-2016 standard coin cells were prepared using the anode plate, a lithium metal counter electrode, and a polypropylene separator (Celgard 3510), with the first electrolyte solution and the second electrolyte solution sequentially added thereto, at 20° C.

The first electrolyte solution was prepared by adding 20 parts by weight of fluoroethylene carbonate (FEC) to 50 parts by weight of a solution of 1.3M $LiN(SO_2C_2F_5)_2$ dissolved in a mixture of ethylene carbonate (EC) and diethyl carbonate (DEC), in a volume ratio of 3:7. The second electrolyte solution was prepared by adding 3 parts by weight of diethyleneglycol divinyl ether (DEGDVE) to 50 parts by weight of a solution of 1.3M $LiN(SO_2C_2F_5)_2$ dissolved in a mixture of ethylene carbonate (EC) and diethyl carbonate (DEC), in a volume ratio of 3:7.

EXAMPLE 2

CR-2016 standard coin cells were prepared in the same manner as in Example 1, except that 2 parts by weight of triethyleneglycol divinyl ether (TEGDVE) were used instead of 3 parts by weight of diethyleneglycol divinyl ether (DEGDVE) in the second electrolyte solution.

EXAMPLE 3

CR-2016 standard coin cells were prepared in the same manner as in Example 1, except that 2 parts by weight of polyethyleneglycol divinyl ether (PEGDVE, Aldrich, Inc. U.S.A., molecular weight: 240) were used instead of 3 parts by weight of diethyleneglycol divinyl ether (DEGDVE) in the second electrolyte solution.

EXAMPLE 4

CR-2016 standard coin cells were prepared in the same manner as in Example 1, except that 1 part by weight of 1,4-butanedioldivinylether (1,4-BDDVE) was used instead of 3 parts by weight of diethyleneglycol divinyl ether (DEGDVE) in the second electrolyte solution.

COMPARATIVE EXAMPLE 1

CR-2016 standard coin cells were prepared in the same manner as in Example 1, except that diethyleneglycol divinyl ether (DEGDVE) was not used in the second electrolyte solution.

COMPARATIVE EXAMPLE 2

CR-2016 standard coin cells were prepared in the same manner as in Example 1, except that fluoroethylene carbonate (FEC) was not used in the first electrolyte solution.

COMPARATIVE EXAMPLE 3

CR-2016 standard coin cells were prepared in the same manner as in Example 1, except that $LiPF_6$ was used instead of $LiN(SO_2C_2F_5)_2$ in the first electrolyte solution.

Preparation of Lithium Battery Including Transition Metal Oxide Cathode Active Material (1)

EXAMPLE 5

80 parts by weight of $LiFePO_4$ (Phostech Lithium, U.S.A.) having an average particle diameter of 200 nm, 10 parts by weight of a graphite based conductive material (Super-P, Timcal Inc.), and 10 parts by weight of polyvinylidenefluoride (PVdF) were dissolved in N-methylpyrrolidone, to prepare a solution having a solid content of 5% by weight. The solution was printed dozens of times on an aluminum current collector having a thickness of 15 μl, using an inkjet printer (Dimatix, Inc., U.S.A.), to prepare a cathode plate having a thickness of 8 μm.

CR-2016 standard coin cells were prepared using the cathode plate, a lithium metal counter electrode, and a polypropylene separator (Celgard 3510). The first electrolyte solution and the second electrolyte solution were sequentially added thereto, at 20° C.

The first electrolyte solution was prepared by adding 0.5M $LiBF_4$ to 50 parts by weight of a solution of 1.3M $LiN(SO_2C_2F_5)_2$ dissolved in a mixture of ethylene carbonate (EC) and diethyl carbonate (DEC), in a volume ratio of 3:7. The second electrolyte solution was prepared by adding 2.5 parts by weight of diethyleneglycol divinyl ether (DEGDVE) to 50 parts by weight of a solution of 1.3M $LiN(SO_2C_2F_5)_2$ dissolved in a mixture of ethylene carbonate (EC) and diethyl carbonate (DEC), in a volume ratio of 3:7.

EXAMPLE 6

CR-2016 standard coin cells were prepared in the same manner as in Example 5, except that 5 parts by weight of diethyleneglycol divinyl ether (DEGDVE) were used instead of 2.5 parts by weight of diethyleneglycol divinyl ether (DEGDVE) in the second electrolyte solution.

EXAMPLE 7

CR-2016 standard coin cells were prepared in the same manner as in Example 5, except that 10 parts by weight of diethyleneglycol divinyl ether (DEGDVE) were used instead of 2.5 parts by weight of diethyleneglycol divinyl ether (DEGDVE) in the second electrolyte solution.

EXAMPLE 8

CR-2016 standard coin cells were prepared in the same manner as in Example 5, except that 10 parts by weight of triethyleneglycol divinyl ether (TEGDVE) were used instead of 2.5 parts by weight of diethyleneglycol divinyl ether (DEGDVE) in the second electrolyte solution.

COMPARATIVE EXAMPLE 4

CR-2016 standard coin cells were prepared in the same manner as in Example 5, except that diethyleneglycol divinyl ether (DEGDVE) was used added to the second electrolyte solution.

Preparation of Lithium Battery Including Transition Metal Oxide Anode Active Material (2)

EXAMPLE 9

80 parts by weight of $Li_4Ti_5O_{12}$ (nGimat Co., U.S.A.) having an average particle diameter of 100 nm, 10 parts by weight of a graphite based conductive material (Super-P, Timcal Inc.), and 10 parts by weight of polyvinylidenefluoride (PVdF) were dissolved in N-methylpyrrolidone to prepare a solution having a solid content of 5% by weight. The solution was printed dozens of times on an aluminum current collector having a thickness of 15 μl, using an inkjet printer (Dimatix, Inc., U.S.A.), in order to prepare an anode plate having a thickness of 4 μm.

CR-2016 standard coin cells were prepared using the anode plate, a lithium metal counter electrode, and a polypropylene separator (Celgard 3510). The first electrolyte solution and the second electrolyte solution were sequentially added thereto, at 20° C.

The first electrolyte solution was prepared by adding 0.5M $LiBF_4$ to 50 parts by weight of a solution of 1.3M $LiN(SO_2C_2F_5)_2$ dissolved in a mixture of ethylene carbonate (EC) and diethyl carbonate (DEC), in a volume ratio of 3:7. The second electrolyte solution was prepared by adding 2.5 parts by weight of diethyleneglycol divinyl ether (DEGDVE) to 50 parts by weight of a solution of 1.3M $LiN(SO_2C_2F_5)_2$ dissolved in a mixture of ethylene carbonate (EC) and diethyl carbonate (DEC), in a volume ratio of 3:7.

EXAMPLE 10

CR-2016 standard coin cells were prepared in the same manner as in Example 9, except that 5 parts by weight of diethyleneglycol divinyl ether (DEGDVE) were used instead of 2.5 parts by weight of diethyleneglycol divinyl ether (DEGDVE) in the second electrolyte solution.

EXAMPLE 11

CR-2016 standard coin cells were prepared in the same manner as in Example 9, except that 10 parts by weight of diethyleneglycol divinyl ether (DEGDVE) were used instead of 2.5 parts by weight of diethyleneglycol divinyl ether (DEGDVE) in the second electrolyte solution.

EXAMPLE 12

CR-2016 standard coin cells were prepared in the same manner as in Example 9, except that 10 parts by weight of triethyleneglycol divinyl ether (TEGDVE) were used instead of 2.5 parts by weight of diethyleneglycol divinyl ether (DEGDVE) in the second electrolyte solution.

COMPARATIVE EXAMPLE 5

CR-2016 standard coin cells were prepared in the same manner as in Example 9, except that diethyleneglycol divinyl ether (DEGDVE) was not added to the second electrolyte solution.

The amounts of the fluorine compound and the polymer contained in the gel polymer electrolyte of the lithium batteries prepared according to Examples 1 to 12 are shown in Table 1 below.

TABLE 1

| | State of polymer electrolyte | Amount of fluorine compound [wt %] | Amount of polymer [wt %] |
|---|---|---|---|
| Example 1 | gel | 16.7 | 3 |
| Example 2 | gel | 16.7 | 2 |
| Example 3 | gel | 16.7 | 2 |
| Example 4 | gel | 16.7 | 1 |
| Example 5 | gel | 4.5 | 2.5 |
| Example 6 | gel | 4.5 | 5 |
| Example 7 | gel | 4.5 | 10 |
| Example 8 | gel | 4.5 | 10 |
| Example 9 | gel | 4.5 | 2.5 |
| Example 10 | gel | 4.5 | 5 |
| Example 11 | gel | 4.5 | 10 |
| Example 12 | gel | 4.5 | 10 |
| Comparative Example 1 | liquid | 16.7 | 0 |
| Comparative Example 2 | liquid | 0 | 0 |
| Comparative Example 3 | Polymer (liquid + separated polymer) | Not measurable | Not measurable |
| Comparative Example 4 | liquid | 4.5 | 0 |
| Comparative Example 5 | liquid | 4.5 | 0 |

EVALUATION EXAMPLE 1

Charge/Discharge Test

The coin cells prepared according to Examples 1 to 4 and Comparative Examples 1 to 3 were charged with a current of 100 mA/g, until the voltages thereof reached 0.001 V (vs. Li). The coin cells were rested for 10 minutes, and then discharged with the same current, until the voltages thereof reached 1.5 V (vs. Li). This process was repeated three times. Then, the coin cells were charged and discharged with a current of 200 mA/g, for $4^{th}$ to $47^{th}$ cycles, and charged and discharged with a current of 100 mA/g for $48^{th}$ to $50^{th}$ cycles. Initial efficiency, capacity retention ratio and average efficiency at 200 mA/g were measured, and the results are shown in Table 2 below.

EVALUATION EXAMPLE 2

Charge/Discharge Test

The coin cells prepared according to Examples 5 to 8 and Comparative Example 4 were charged with a current of 15 mA/g, until the voltages thereof reached 4.1 V (vs. Li). The coin cells were rested for 10 minutes, and then discharged with the same current, until the voltages thereof reached 2.7 V (vs. Li). This process was repeated 50 times. Initial efficiency, capacity retention ratio, and average efficiency at 15 mA/g were measured, and the results are shown in Table 2 below.

EVALUATION EXAMPLE 3

Charge/Discharge Test

The coin cells prepared according to Examples 9 to 12 and Comparative Example 5 were charged with a current of 15 mA/g, until the voltages thereof reached 1.1 V (vs. Li). The coin cells were rested for 10 minutes, and then discharged with the same currentm until the voltages thereof reached 2.0 V (vs. Li). This process was repeated 50 times. Initial efficiency, capacity retention ratio, and average efficiency at 15 mA/g were measured, and the results are shown in Table 2 below.

The states of the polymer electrolytes and charging and discharging characteristics of the lithium batteries prepared according to Examples 1 to 12 and Comparative Examples 1 to 5 are shown in Table 2 below. In Table 2, the initial efficiency, capacity retention ratio, and average efficiency at 200 mA/g (Examples 1 to 4 and Comparative Examples 1 to 3) and the initial efficiency, capacity retention ratio, and average efficiency at 15 mA/g (Examples 5 to 12 and Comparative Examples 4 to 5) were calculated using Equations 1 to 4 below.

Initial efficiency=discharge capacity of $1^{st}$ cycle/ charge capacity of $1^{st}$ cycle     Equation 1

Capacity retention ratio of $50^{th}$ cycle=discharge capacity of $50^{th}$ cycle/discharge capacity of $1^{st}$ cycle     Equation 2

Average efficiency at 200 mA/g=average discharge capacity/charge capacity of each cycle     Equation 3

Average efficiency at 15 mA/g=average discharge capacity/charge capacity of each cycle     Equation 4

TABLE 2

| | State of polymer electrolyte | Initial efficiency [%] | Capacity retention ratio at $50^{th}$ cycle [%] | Average efficiency [%] |
|---|---|---|---|---|
| Example 1 | gel | 68.40 | 86.58 | 98.89 |
| Example 2 | gel | 68.47 | 88.18 | 98.95 |
| Example 3 | gel | 68.52 | 84.00 | 98.92 |
| Example 4 | gel | 68.19 | 86.85 | 98.88 |
| Example 5 | gel | 97.14 | 96.61 | 99.71 |
| Example 6 | gel | 99.70 | 98.09 | 99.95 |
| Example 7 | gel | 99.64 | 98.80 | 99.90 |
| Example 8 | gel | 99.53 | 98.29 | 99.93 |
| Example 9 | gel | 64.65 | 60.55 | 96.24 |
| Example 10 | gel | 68.08 | 63.38 | 96.35 |
| Example 11 | gel | 69.39 | 82.41 | 96.78 |
| Example 12 | gel | 68.68 | 87.10 | 95.55 |
| Comparative Example 1 | liquid | 67.56 | 80.43 | 98.40 |
| Comparative Example 2 | liquid | 67.49 | 76.52 | 98.58 |
| Comparative Example 3 | Polymer (liquid + separated polymer) | Not measurable | Not measurable | Not measurable |
| Comparative Example 4 | liquid | 98.25 | 62.65 | 98.78 |
| Comparative Example 5 | liquid | 65.02 | 56.97 | 95.18 |

As shown in Table 1, the coin cells according to Examples 1 to 4 had better initial efficiency, capacity retention ratio, and average efficiency, as compared to the coin cells according to Comparative Examples 1 and 2. According to Comparative Example 3, the polymerization rapidly proceeded, when the first electrolyte solution was mixed with the second electrolyte solution, so that a solid polymer that separated from the organic solvent was formed, instead of a gel polymer electrolyte including a gel state polymer impregnated with the organic solvent. Thus, a charge/discharge test was not possible.

The charging and discharging characteristics of the coin cells according to Examples 1 to 4 were improved by the formation of the gel polymer electrolyte, which inhibits irreversible reactions between the composite anode active material having a non-uniform surface and the electrolyte solution. The gel polymer operates as a support for the structures of the active material and the electrodes, during charging and discharging.

The coin cells according to Examples 5 to 8 had better initial efficiencies, capacity retention ratios, and average efficiencies, as compared to the coin cells according to Comparative Example 4. In particular, the capacity retention ratios were significantly improved.

As described above, according to the one or more of the above embodiments, a gel polymer electrolyte may be simply prepared, by mixing a fluorine compound that reacts with residual moisture in an electrolyte, to produce a Protonic acid or a Lewis acid, and a monomer including a vinyl group, at room temperature, without a curing device. A lithium battery including the gel polymer electrolyte has excellent charging and discharging characteristics, such as initial efficiency and capacity retention ratio.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A polymer electrolyte comprising:

a lithium salt;

an organic solvent comprising residual moisture;

a fluorinated organic compound effective to provide a Protonic acid or a Lewis acid when contacted with moisture, wherein the fluorinated organic compound comprises at least one compound selected from the group consisting of:

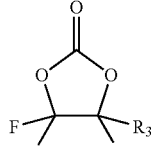

Formula 2

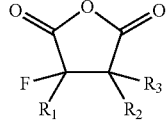

Formula 3

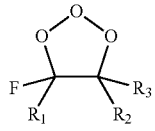

Formula 4

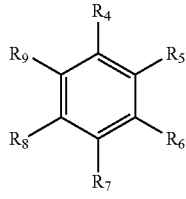

Formula 5

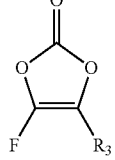

Formula 6

-continued

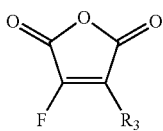
Formula 7

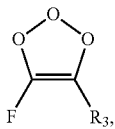
Formula 8 wherein, $R_1$ to $R_3$ are each independently a hydrogen atom or a C1 to C10 alkyl group that is unsubstituted or substituted with a fluorine atom, $R_4$ to $R_9$ are each independently a fluorine atom or a C1 to C10 alkyl group that is unsubstituted or substituted with a fluorine atom, and at least one of $R_4$ to $R_9$ is a fluorine atom; and a polymer of a monomer represented by Formula 1 below:

$$H_2C=HC-(OR_1)_n-OCH=CH_2,$$  Formula 1 wherein R is a C2-C10 alkylene group, and n is in a range of from about 1 to about 1000.

2. The polymer electrolyte of claim 1, wherein:
the fluorinated organic compound produces a Protonic acid or a Lewis acid by a reaction with residual moisture in the organic solvent; and
the lithium salt is inactive with respect to the residual moisture in the organic solvent.

3. The polymer electrolyte of claim 1, wherein the polymer is prepared by a reaction between a Protonic acid or a Lewis acid, produced by a reaction between the fluorinated organic compound and residual moisture in the organic solvent, and the monomer of Formula 1.

4. The polymer electrolyte of claim 1, wherein the polymer is impregnated with an electrolyte solution comprising the lithium salt, the organic solvent, and the fluorinated organic compound.

5. The polymer electrolyte of claim 1, wherein the lithium salt comprises fluorine and comprises at least one compound selected from the group consisting of $LiBF_4$, $LiPF_6$, $LiAsF_6$, $LiSbF_6$, and $LiPF_3(CF_2CF_3)_3$.

6. The polymer electrolyte of claim 1, wherein the lithium salt comprises at least one compound selected from the group consisting of $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$ (wherein p and q are integers), lithium difluoro (oxalato) borate (LiFOB), lithium bis(oxalato)borate (LiBOB), and lithium (malonato oxalato) borate (LiMOB).

7. The polymer electrolyte of claim 1, wherein the amount of the fluorinated organic compound is in the range of from about 0.1 to about 30 wt %, based on the total weight of the polymer electrolyte.

8. The polymer electrolyte of claim 1, wherein the amount of the fluorinated organic compound is in the range of from about 0.5 to about 20 wt %, based on the total weight of the polymer electrolyte.

9. The polymer electrolyte of claim 1, wherein the amount of the polymer is in the range of from about 0.1 to about 30 wt %, based on the total weight of the polymer electrolyte.

10. The polymer electrolyte of claim 1, wherein the amount of the polymer is in the range of from about 0.5 to about 20 wt %, based on the total weight of the gel polymer electrolyte.

11. The polymer electrolyte of claim 1, wherein the polymer electrolyte is a gel polymer electrolyte.

12. A lithium battery comprising:
a cathode;
an anode; and
a polymer electrolyte according to claim 1.

13. The lithium battery of claim 12, wherein the fluorinated organic compound is fluoroethylene carbonate.

14. The polymer electrolyte of claim 1, wherein the fluorinated organic compound is fluoroethylene carbonate.

15. A method of preparing a polymer electrolyte, the method comprising:
preparing a first solution including a fluorinated organic compound and an organic solvent, wherein the fluorinated organic compound comprises at least one compound selected from the group consisting of:

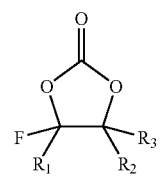
Formula 2

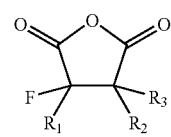
Formula 3

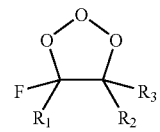
Formula 4

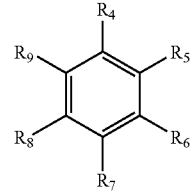
Formula 5

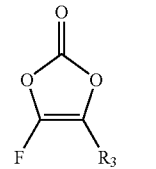
Formula 6

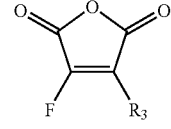
Formula 7

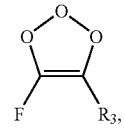
Formula 8 wherein, $R_1$ to $R_3$ are each independently a hydrogen atom or a C1 to C10 alkyl group that is unsubstituted or substituted with a fluorine atom, $R_4$ to $R_9$ are each independently a fluorine atom or a C1 to C10 alkyl group that is unsubstituted or substituted with a fluorine atom, and at least one of $R_4$ to $R_9$ is a fluorine atom;

preparing a second solution including a monomer represented by Formula 1 below and an organic solvent; and mixing the first solution and the second solution, to form the polymer electrolyte, wherein the first solution or the second solution further includes a lithium salt:

   Formula 1 wherein R is a C2-C10 alkylene group, and n is from about 1 to about 1000.

16. The method of claim 15, wherein:
the fluorinated organic compound produces a Protonic acid or a Lewis acid, by reacting with residual moisture in the organic solvent; and
the lithium salt is inactive with respect to the residual moisture.

17. The method of claim 15, wherein the mixing of the first and second solutions comprises:
polymerizing the monomer represented by Formula 1 into a gel polymer; and
impregnating the gel polymer with an electrolyte solution comprising the lithium salt, the organic solvent, and the fluorinated organic compound, to form the polymer electrolyte.

18. The method of claim 17, wherein the polymerization is performed at room temperature.

19. The method of claim 15, wherein the lithium salt comprises fluorine.

20. The method of claim 19, wherein the lithium salt comprises fluorine and comprises at least one compound selected from the group consisting of $LiBF_4$, $LiPF_6$, $LiAsF_6$, $LiSbF_6$, and $LiPF_3(CF_2CF_3)_3$.

21. The method of claim 15, wherein the lithium salt comprises at least one compound selected from the group consisting of $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$ (wherein p and q are integers), lithium difluoro (oxalato) borate (LiFOB), lithium bis(oxalato)borate (LiBOB), and lithium (malonato oxalato) borate (LiMOB).

22. The method of claim 15, wherein the amount of the fluorinated organic compound is in the range of from about 0.1 to about 30 wt %, based on the total weight of the first solution and the second solution.

23. The method of claim 15, wherein the amount of the fluorinated organic compound is in the range of from about 0.5 to about 20 wt %, based on the total weight of the first solution and the second solution.

24. The method of claim 15, wherein the amount of the monomer represented by Formula 1 is in the range of from about 0.1 to about 30 wt %, based on the total weight of the first solution and the second solution.

25. The method of claim 15, wherein the amount of the monomer represented by Formula 1 is in the range of from about 0.5 to about 20 wt %, based on the total weight of the first solution and the second solution.

26. The method of claim 15, wherein a molecular weight of the monomer represented by Formula 1 is in a range of from about 100 to about 1000.

27. The method of claim 15, wherein the polymer electrolyte is a gel polymer electrolyte.

28. The method of claim 15, wherein the fluorinated organic compound is fluoroethylene carbonate.

29. A method of preparing a lithium battery, the method comprising:
providing a cathode and an anode;
preparing a first solution including a fluorinated organic compound and an organic solvent, wherein the fluorinated organic compound comprises at least one compound selected from the group consisting of:

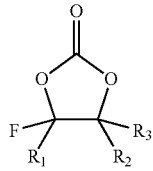   Formula 2

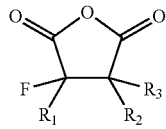   Formula 3

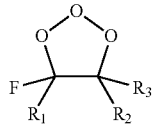   Formula 4

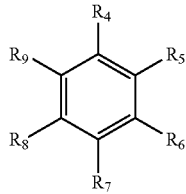   Formula 5

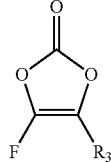   Formula 6

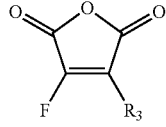   Formula 7

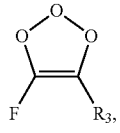   Formula 8 wherein, $R_1$ to $R_3$ are each independently a hydrogen atom or a C1 to C10 alkyl group that is unsubstituted or substituted with a fluorine atom, $R_4$ to $R_9$ are each independently a fluorine atom or a C1 to C10 alkyl group that is unsubstituted or substituted with a fluorine atom, and at least one of $R_4$ to $R_9$ is a fluorine atom;

preparing a second solution including a monomer represented by Formula 1 below and an organic solvent; and applying the first solution and the second solution to at least one of the cathode and the anode to form a polymer electrolyte on the at least one of the cathode and the anode; and contacting the cathode and the anode with the polymer electrolyte disposed therebetween to prepare the lithium battery, wherein the polymer electrolyte further comprises a lithium salt:

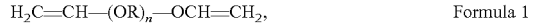

Formula 1 wherein R is a C2-C10 alkylene group, and n is from about 1 to about 1000.

30. The method of claim 29, wherein the applying of the first solution and the second solution comprises simultaneously or sequentially coating or printing the first and second solutions on the electrodes.

31. The method of claim 29, wherein:
the applying of the first solution and the second solution comprises reacting the fluorinated organic compound with residual moisture in the organic solvent, to produce a Protonic acid or a Lewis acid; and
the lithium salt is inactive with respect to the residual moisture in the organic solvent.

32. The method of claim 29, wherein the applying of the first solution and the second solution comprises:

polymerizing the monomer represented by Formula 1 into a gel polymer; and impregnating the gel polymer with an electrolyte solution comprising the lithium salt, the organic solvent, and the fluorinated organic compound, to form the polymer electrolyte.

33. The method of claim 32, wherein the polymerization is performed at room temperature.

34. The method of claim 29, wherein the lithium salt comprising fluorine comprises at least one compound selected from the group consisting of $LiBF_4$, $LiPF_6$, $LiAsF_6$, $LiSbF_6$, and $LiPF_3(CF_2CF_3)_3$.

35. The method of claim 29, wherein the lithium salt comprises at least one compound selected from the group consisting of $LiCF_3CO_2$, $LiN(COCF_3)_2$, $LiN(COCF_2CF_3)_2$, $LiCF_3SO_3$, $LiCF_3CF_2SO_3$, $LiC_4F_9SO_3$, $LiN(CF_3SO_2)_2$, $LiN(C_2F_5SO_2)_2$, $LiN(C_pF_{2p+1}SO_2)(C_qF_{2q+1}SO_2)$ (wherein p and q are integers), lithium difluoro (oxalato) borate (LiFOB), lithium bis(oxalato)borate (LiBOB), and lithium (malonato oxalato) borate (LiMOB).

* * * * *